United States Patent [19]
Klein et al.

[11] Patent Number: 5,943,479
[45] Date of Patent: Aug. 24, 1999

[54] METHOD FOR REDUCING THE RATE OF INTERRUPTS IN A HIGH SPEED I/O CONTROLLER

[75] Inventors: Philippe Klein; Aviad Wertheimer; Gideon Paul, all of Jerusalem, Israel

[73] Assignee: Digital Equipment Corporation, Houston, Tex.

[21] Appl. No.: 08/778,327

[22] Filed: Jan. 2, 1997

[51] Int. Cl.$^6$ .................................................. G06F 13/00
[52] U.S. Cl. ..................... 395/200.42; 395/842; 395/733
[58] Field of Search ........................... 395/200, 842–848, 395/200.42, 200.43, 868–870, 733–742

[56] References Cited

U.S. PATENT DOCUMENTS

| | | | |
|---|---|---|---|
| 4,599,689 | 7/1986 | Berman | 395/842 |
| 5,452,432 | 9/1995 | Macachor | 395/842 |
| 5,546,543 | 8/1996 | Young et al. | 395/200.65 |
| 5,708,814 | 1/1998 | Short et al. | 395/733 |
| 5,761,427 | 6/1998 | Shah et al. | 395/200.53 |

*Primary Examiner*—Christopher B. Shin
*Attorney, Agent, or Firm*—Hamilton, Brook, Smith and Reynolds, P.C.

[57] ABSTRACT

A method to reduce the rate of interrupts by the central processing unit (CPU) without any loss of interrupts. The method uses two parameters. The first parameter sets the event threshold, which is the maximum value of consecutive events allowed to occur, for example, the maximum number of received data packets before an interrupt is posted (for example, a receive interrupt) to the CPU. The second parameter sets the event time-out, which is the maximum time an event can be pending before posting an interrupt to the CPU. The second parameter is needed since the flow of events in the system is unpredictable and without the time-out limit handling of the event can be delayed indefinitely.

10 Claims, 4 Drawing Sheets

5,943,479

METHOD FOR REDUCING THE RATE OF INTERRUPTS IN A HIGH SPEED I/O CONTROLLER

BACKGROUND OF THE INVENTION

The present invention relates to high speed input/output (I/O) controllers, and more particularly, to a method of handling interrupts using an interrupt migration method.

As is well known in the art, the function of I/O processing has grown increasingly complex. Users of computer systems and network systems compete for resources simultaneously. This competition, for example, is sometimes by order of request and sometimes based on a priority basis. And through it all, it is the CPU function that must arbitrate the momentary allocation of resources to a specific user, provide synchronization and control over the various devices involved, and keep track of the actual data transfer so that the job may ultimately be "put back together," and so that the user can be assured that his or her program actually receives all inputs and transmits all outputs—each to or from the proper place and in the proper order.

As is also known in the art, in normal operating environments, a central processing unit (CPU) may be simultaneously communicating with one or more of its external devices (of same or different types), but seldom with all and usually not in any predictable pattern. This requires the establishment of timing and control procedures to effect a proper connection and to provide "momentary interface synchronization" for individual message pulses.

For communication (or transmissions) initiated by devices, the device must signal the processor to interrupt the program flow and alert the operating system that an external device needs attention, much like a doorbell rings or a telephone signals that someone outside wishes to communicate with those within. In both cases, action must be taken in a timely fashion to ensure that no signal is unintentionally disregarded and no data are lost, a distinct possibility that occurs when the CPU is simultaneously communicating with several high speed devices.

An I/O controller, such as a disk controller or a network controller, typically moves data between a disk subsystem or a network subsystem, and other units of a computer system. When inbound data is received from the subsystem, the controller typically transfers the data to a main memory unit, to await further processing. The memory unit may be connected to a system bus, which is shared by other units of the computer connected thereto. Outbound data, retrieved from the memory unit, are subsequently transferred by the controller to the subsystem. A direct memory access (DMA) function located on the controller directs movement of data through the controller.

The I/O controller manages its input and output data streams by moving the data streams from/to a memory via DMA. The I/O controller reports an event on completion of a DMA operation by posting an interrupt. For example, the event may be the completion of transmitting a packet of data or receiving a packet of data. As data rates handled by the I/O controller increases, the amount of interrupts increases. The overall result may be system performance degradation.

As is also known, when the CPU receives an interrupt, it does an operation called "context switching," before executing an interrupt handler program or scheduling the interrupt for future processing. The context switching operation is time consuming, since the CPU typically stores all data needed to continue execution of the program once it returns from the interrupt routine. As a result, the CPU is utilized in a less effective manner, since normal flow of the program is disrupted causing instruction cache misses to occur.

In a system that includes I/O controllers that send a high interrupt rate, the CPU may be overwhelmed, since it will be using a high percentage of its time for interrupt handling. The result is degradation of overall system performance.

SUMMARY OF THE INVENTION

In accordance with one embodiment of the present invention, a method to reduce transmit interrupts includes the steps of providing a central processing unit (CPU), providing an input/output (I/O) device connected to the CPU, the I/O device having a system bus interface circuit to provide connection to a system bus, a network interface circuit to provide connection to a network system, a buffer memory to handle a plurality of input and output data streams, and a direct memory access (DMA) function device, in the DMA function device, setting a transmit count limit variable to a threshold of consecutive transmit packets transmitted before posting a transmit interrupt to the CPU, setting a transmit time limit variable to a time-out time before posting the transmit interrupt to the CPU, initializing a transmit count counter and a transmit time counter to zero, waiting for a transmission of a packet of data, upon a transmission of a packet of data, waiting for a predetermined event to occur, determining whether the transmit interrupt should be posted to the CPU in response to a predetermined event, and returning to the step of initializing after posting of the transmit interrupt to the CPU. With such a method the time that a CPU wastes on context switching as a result of interrupts is reduced and overall system performance enhanced.

In accordance with another embodiment of the present invention, a method to reduce receive interrupts includes the steps of providing a central processing unit (CPU), providing an input/output (I/O) device connected to the CPU, the I/O device having a system bus interface circuit to provide connection to a system bus, a network interface circuit to provide connection to a network system, a buffer memory to handle a plurality of input and output data streams, and a direct memory access (DMA) function device, in the DMA function device, setting a receive count limit variable to a threshold of packets received before posting a receive interrupt to the CPU, setting a receive time limit variable to a time-out time before posting the receive interrupt to the CPU, initializing a receive count counter and a receive time counter to zero, waiting for a reception of a packet of data, upon the reception of a packet of data, waiting for a predetermined event to occur, determining whether the receive interrupt should be posted to the CPU IN response to a predetermined event, and returning to the step of initializing after posting of the receive interrupt to the CPU.

BRIEF DESCRIPTION OF THE DRAWINGS

The novel features believed characteristic of the invention are set forth in the appended claims. The invention itself, however, as well as other features and advantages there of, will be best understood by reference to the detailed description of specific embodiments which follows, when read in conjunction with the accompanied drawings, wherein:

DESCRIPTION OF THE PREFERRED EMBODIMENT(S)

Figure 1:
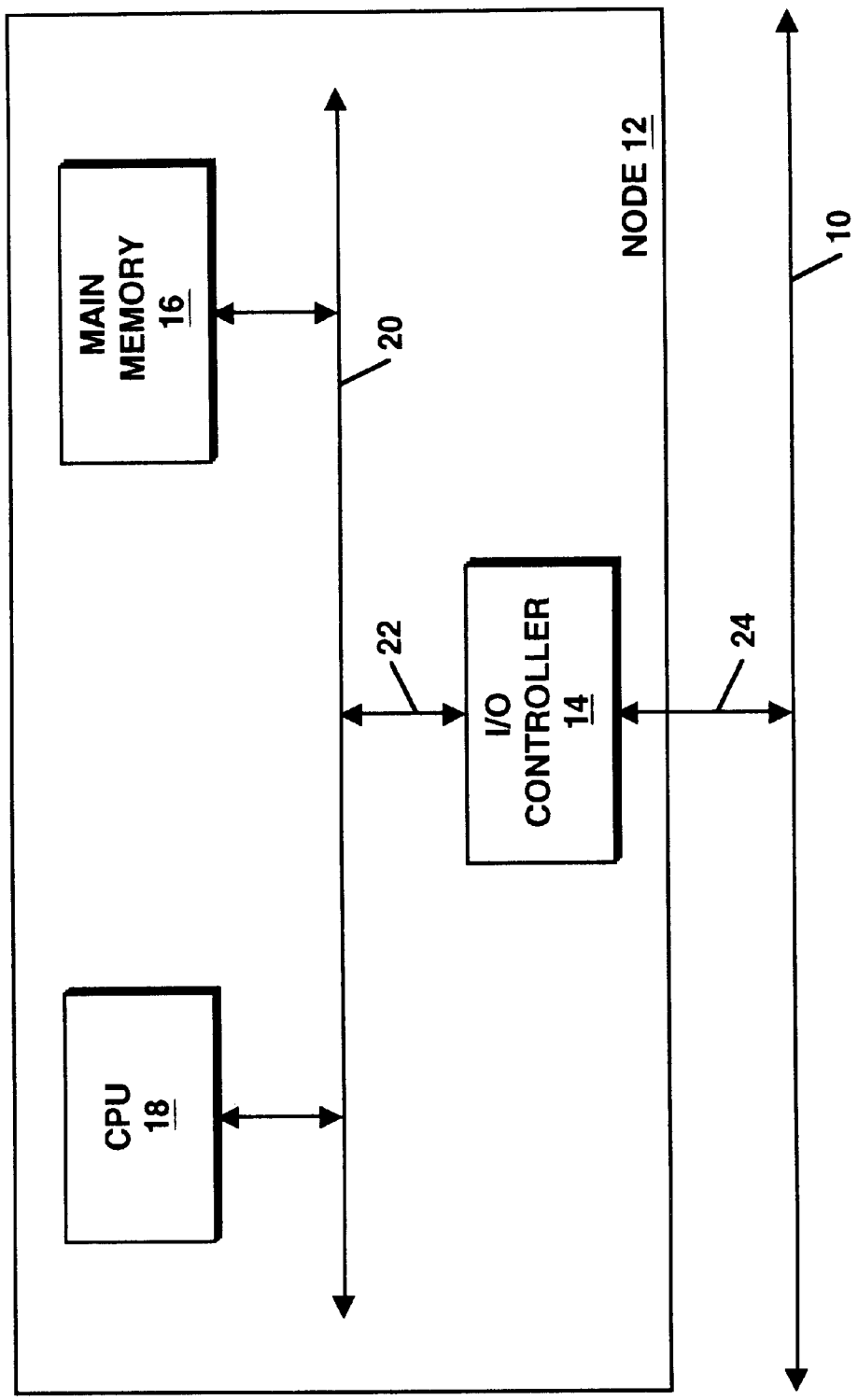
FIG. 1 is a block diagram illustrating a local area network connected through an I/O controller to a system bus.

FIG. 1 illustrates a subsystem, such as a local network 10, connected to a node 12 that includes an I/O controller 14, 1 main memory 16, a central processing unit (CPU) 18, all of which are interconnected by a system bus 20. For the embodiment of FIG. 1, the I/O controller 14 connects to the system bus 20 through a bi-directional path 22, and connects to the network subsystem 10 through a bi-directional path 24.

During a receive operation, data are transferred from the network subsystem 10 into the I/O controller 14 and eventually transferred to the main memory 16 to await processing. Data transferred between the I/O controller 14 and the main memory 16 is performed in accordance with a direct memory access (DMA) transfer on the system bus 20.

During a transmit operation, data retrieved from the main memory 16 is transferred from the I/O controller 14 to the network system 10.

Upon completion of the DMA operation, for example, completion of transmitting a packet of data or receiving a packet of data, the I/O controller 14 reports an event by posting an interrupt to the CPU 18. When the CPU 18 receives the interrupt it does an operation called context switching, before executing an interrupt handler program or scheduling the interrupt for future processing. During the context switching, time is consumed because the CPU 18 stores all data needed to continue execution of the program once it returns from the interrupt routine and loads the interrupt routine into its instruction cache (not shown). If the instruction cache is too small, the CPU 18 may need to evict the current program from the instruction cache and load it back on returning from the interrupt routine.

Figure 2:
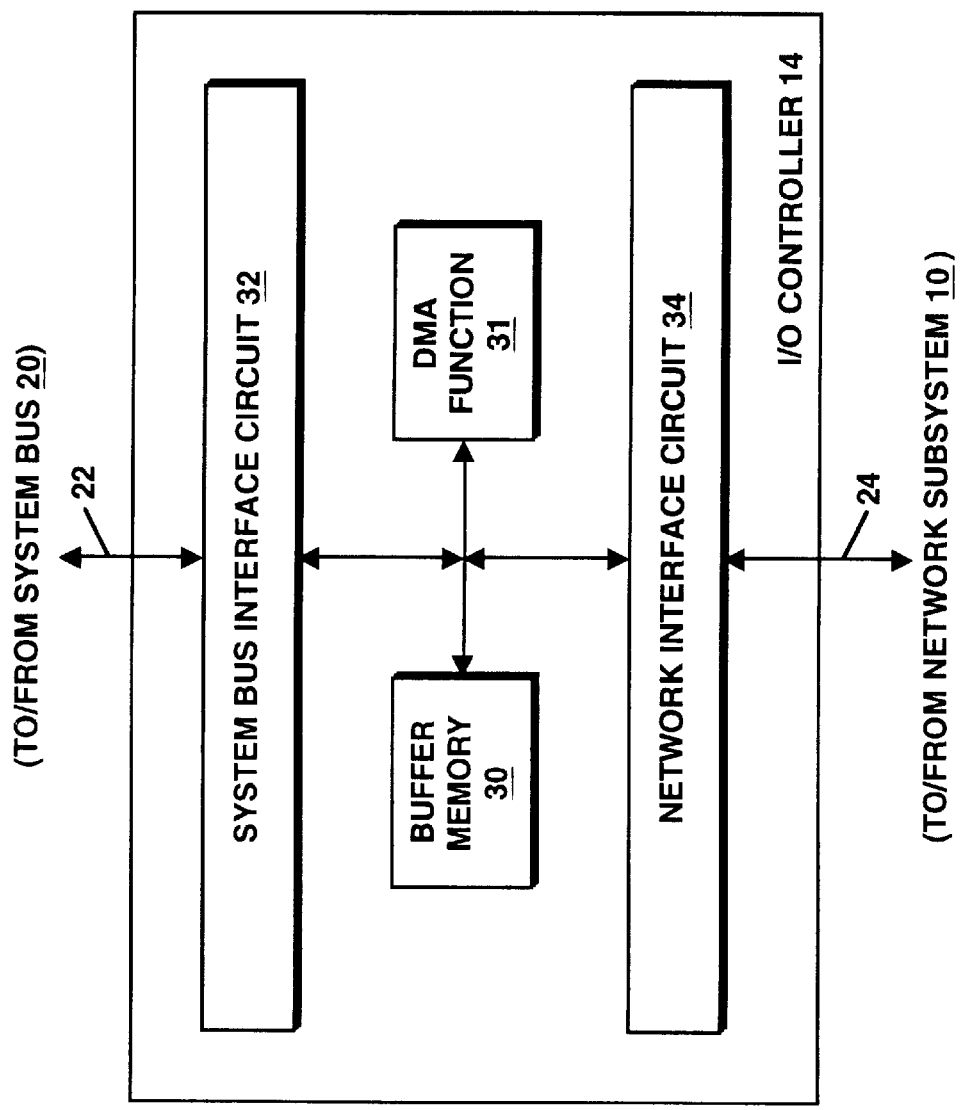
FIG. 2 is a block diagram of the controller of FIG. 1.

Referring now to FIG. 2, the I/O controller 14 is show to include a buffer memory 30, a DMA function block 31, a system bus interface circuit 32, and a network interface circuit 34. The system bus interface circuit 32 allows data streams to flow from the buffer memory 30 to/from the system bus 20. The network interface circuit 34 allows data streams to flow from the buffer memory 30 to/from the network subsystem 10. The I/O controller 14 manages the input and output of data streams by moving them to/from its buffer memory 30 via DMA 31. Upon completion of each DMA operation, the I/O controller 14 reports the event as an interrupt to the CPU 18.

Implementation of the present method resides, for example, in the DMA function block 31 of the I/O controller 14. It may also be implemented in a DMA function block of a system bus adapter (not shown). An objective of the present invention is to reduce the rate of interrupts by the CPU 18 without any loss of interrupts. The invention uses two parameters. The first parameter sets the event threshold, which is the maximum value of consecutive events allowed to occur, for example, the maximum number of received data packets before an interrupt is posted (for example, a receive interrupt) to the CPU 18. The second parameter sets the event time-out, which is the maximum time an event can be pending before posting an interrupt to the CPU 18. The second parameter is needed since the flow of events in the system is unpredictable and without the time-out limit handling of the event can be delayed indefinitely. For example, if only one data packet is received and the event threshold is greater than one, the I/O controller 14 will wait the time specified in the time-out parameter before posting an interrupt to the CPU 18.

Figure 3A:
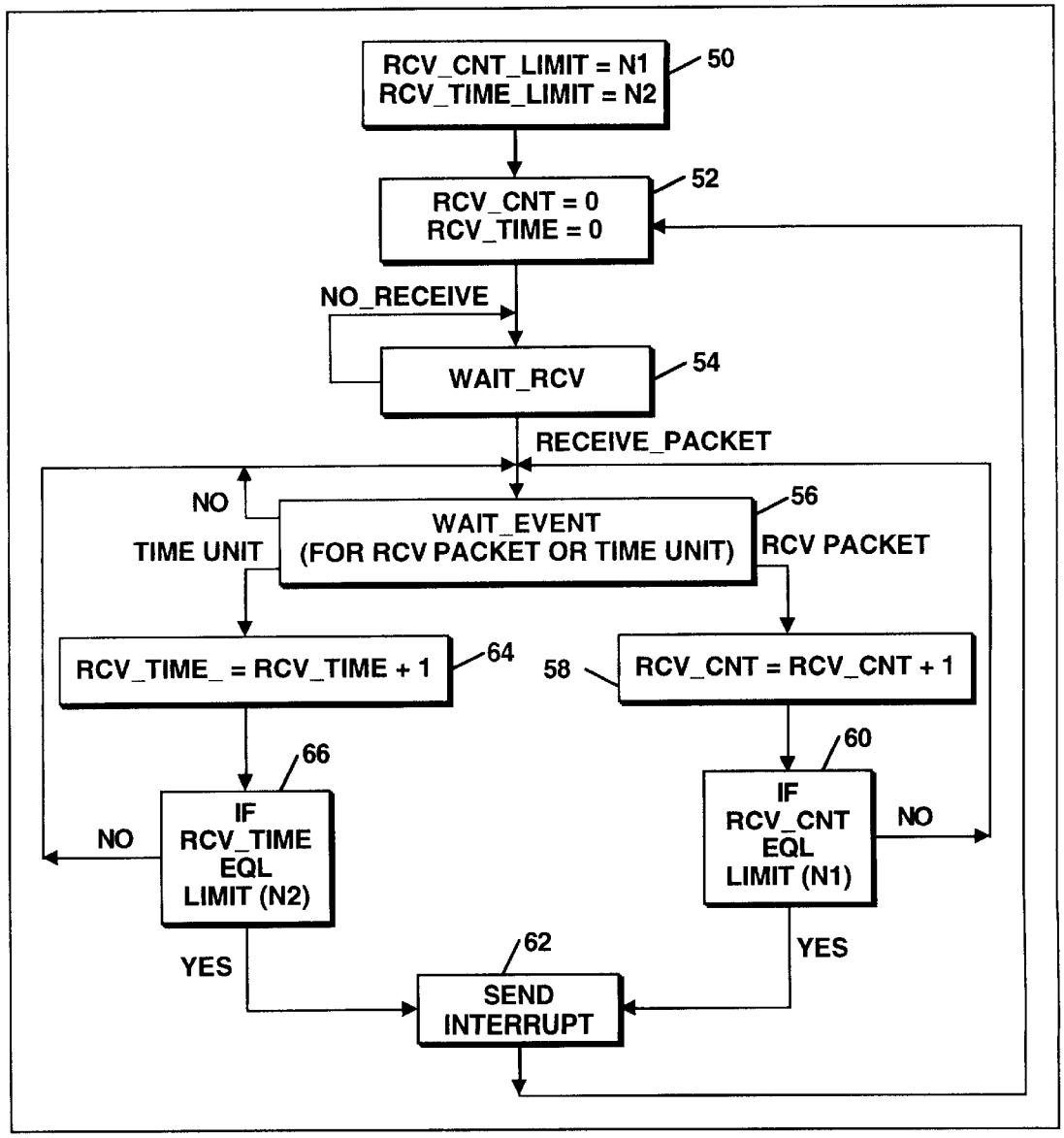
FIGS. 3A–3B are flowcharts detailing the process performed by the controller in accordance with the invention.
Figure 3B:
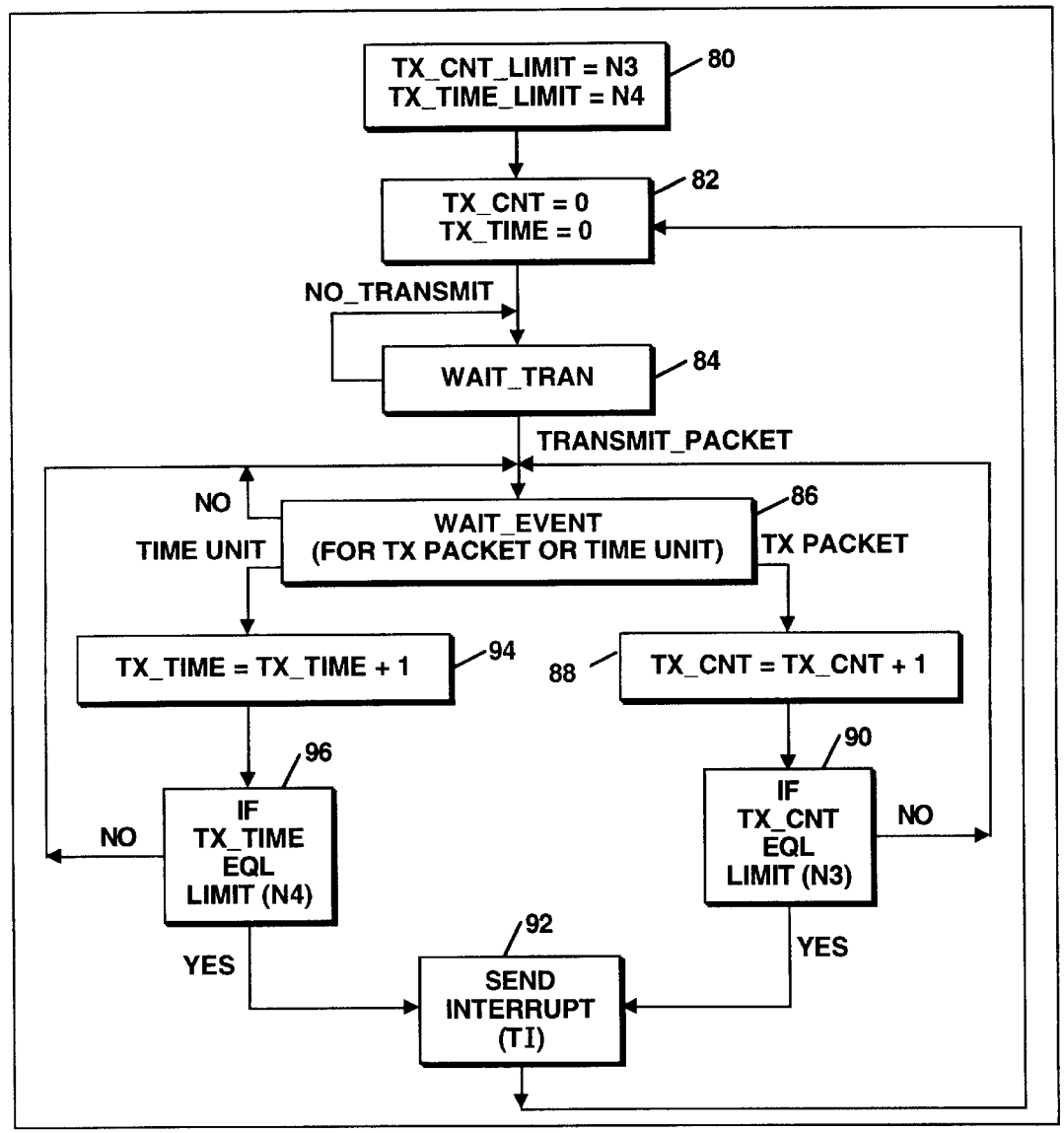

The interrupt mitigation process employed by the I/O controller 14 in accordance with the invention may be better understood from the flow charts of FIGS. 3A–3B, wherein the following variables are utilized:

o RCV_CNT_LIMIT: the parameter defines the threshold (N1) of consecutive receive packets before posting a receive interrupt (RI).

o RCV_TIME_LIMIT: the parameter define Time-out time (N2) following a reception, before posting a receive interrupt (RI).

o RCV_CNT: counter that counts the amount of consecutive packets before issuing a RI.

o RCV $_{13}$ TIME: counter that counts the amount of unit times before issuing a RI.

o WAIT_RCV: state in which the present method waits until the first packet after a RI or reset has been received.

o WAIT_EVENT: state in which the present method waits until some event occurs (receive a packet or a time unit passes).

o TX_CNT_LIMIT: the parameter defines the threshold (N3) of consecutive transmit packets before posting a transmit interrupt (TI).

o TX_TIME_LIMIT: the parameter define Time-out time (N4) following a transmission, before posting a TI.

o TX_CNT: counter that counts the amount of consecutive packets that were transmitted before a TI is issued.

o TX_TIME: counter that counts the amount of unit times passed after transmission of a packet before a TI is issued.

o WAIT_TRAN: state in which the present method waits until a packet is transmitted after a TI or reset occurred.

o WAIT_EVENT: state in which the present method waits until some event occurs (a packet is transmitted or a time unit passed).

Referring, to FIG. 3A, at step 50, RCV_CNT_LIMIT is set equal to N1 and RCV_TIME_LIMIT set equal to N2. At step 52, the RCV_CNT counter is initialized to zero, and the RCV_TIME counter is initialized to zero. At step 54, the process moves to the WAIT_RCV state and continues to wait until a packet of data is received. When a packet of data is received, the process continues at step 56 to the WAIT_EVENT state, wherein it increments RCV_CNT by one at step 58. At step 60, if the RCV_CNT value does not equal the threshold value N1, the process returns to step 56. If the RCV_CNT value equals the limit of N1, an interrupt is posted at step 62 and the process returns to step 52.

If, while in the WAIT_EVENT state at step 56, a specified time unit is reached, the process increments RCV_TIME by one at step 64. At step 66, if RCV_TIME value does not equal the threshold value N2, the process returns to step 56. If the RCV_TIME value equals the limit of N2, an interrupt is posted at step 62 and the process returns to step 52.

Referring to FIG. 3B, at step 80, TX_CNT_LIMIT is set equal to N3 and TX_TIME_LIMIT set equal to N4. At step 82, the TX_CNT counter is initialized to zero, and the TX_TIME counter is initialized to zero. At step 84, the process moves to the WAIT_TRAN state and continues to wait until a packet of data is transmitted. When a packet of data is transmitted, the process continues at step 86 to the WAIT_EVENT state, wherein it increments TX_CNT by one at step 88, if a transmission occurs. At step 90, if the TX_CNT value does not equal the threshold value N3, the process returns to step 86. If the TX_CNT value equals the limit of N3, an interrupt is posted at step 92 and the process returns to step 82.

If, while in the WAIT_EVENT state at step 86, a specified time unit is reached, the process increments TX_TIME by one at step 94. At step 96, if the TX_TIME value does not equal the threshold value N4, the process returns to step 86. If the TX_TIME value equals the limit of N4, an interrupt is posted at step 92 and the process returns to step 82.

Having described a preferred embodiment of the invention, it will now become apparent, to one skilled in the art that other embodiments incorporating its concepts may be used. It is felt therefore, that this embodiment should not be limited to the disclosed embodiment, but rather should be limited only by the spirit and scope of the appended claims.

What is claimed is:

1. A method to reduce transmit interrupts comprising the steps of:

providing a central processing unit (CPU);

providing an input/output (I/O) device connected to the CPU, the I/O device having a system bus interface circuit to provide connection to a system bus, a network interface circuit to provide connection to a network system, a buffer memory to handle a plurality of input and output data streams, and a direct memory access (DMA) function device;

in the DMA function device, setting a transmit count limit variable to a threshold of consecutive transmit packets transmitted before posting a transmit interrupt to the CPU;

setting a transmit time limit variable to a time-out time before posting the transmit interrupt to the CPU;

initializing a transmit count counter and a transmit time counter to zero;

waiting for a transmission of a packet of data;

upon a transmission of a packet of data, waiting for a predetermined event to occur;

determining whether the transmit interrupt should be posted to the CPU IN response to a predetermined event; and returning to the step of initializing after posting of the transmit interrupt to the CPU.

2. The method to reduce transmit interrupts according to claim 1 wherein the controller device is an input/output (I/O) controller.

3. The method to reduce transmit interrupts according to claim 1 wherein the controller device is a system bus adapter.

4. The method to reduce transmit interrupts according to claim 1 wherein the step of determining whether the transmit interrupt should be posted to the CPU in response to the predetermined event comprises the steps of:

transmitting the data packet;

incrementing the transmit count counter by one;

returning to the step of determining if the transmit count counter does not equal the transmit count limit variable; and posting the transmit interrupt to the CPU if the transmit count counter does not equal the transmit count limit variable.

5. The method to reduce transmit interrupts according to claim 4 wherein the step of determining whether the transmit interrupt should be posted to the CPU in response to the predetermined event comprises the steps of:

waiting a specified time unit;

incrementing the transmit count counter by one;

returning to the step of determining if the transmit time counter does not equal the transmit time limit variable; and posting the transmit interrupt to the CPU if the transmit time counter does not equal the transmit time limit variable.

6. A method to reduce receive interrupts comprising the steps of:

providing a central processing unit (CPU);

providing an input/output (I/O) device connected to the CPU, the I/O device having a system bus interface circuit to provide connection to a system bus, a network interface circuit to provide connection to a network system, a buffer memory to handle a plurality of input and output data streams, and a direct memory access (DMA) function device;

in the DMA function device, setting a receive count limit variable to a threshold of packets received before posting a receive interrupt to the CPU;

setting a receive time limit variable to a time-out time before posting the receive interrupt to the CPU;

initializing a receive count counter and a receive time counter to zero;

waiting for a reception of a packet of data;

upon the reception of a packet of data, waiting for a predetermined event to occur;

determining whether the receive interrupt should be posted to the CPU IN response to a predetermined event; and returning to the step of initializing after posting of the receive interrupt to the CPU.

7. The method to reduce receive interrupts according to claim 6 wherein the controller device is an input/output (I/O) controller.

8. The method to reduce receive interrupts according to claim 6 wherein the controller device is a system bus adapter.

9. The method to reduce receive interrupts according to claim 6 wherein the step of determining whether the receive interrupt should be posted to the CPU in response to the predetermined event comprises the steps of:

receiving the data packet;

incrementing the receive count counter by one;

returning to the step of determining if the receive count counter does not equal the receive count limit variable; and posting the receive interrupt to the CPU if the receive count counter does not equal the receive count limit variable.

10. The method to reduce receive interrupts according to claim 9 wherein the step of determining whether the receive interrupt should be posted to the CPU in response to the predetermined event comprises the steps of:

waiting a specified time unit;

incrementing the receive count counter by one;

returning to the step of determining if the receive time counter does not equal the receive time limit variable; and posting the receive interrupt to the CPU if the receive time counter does not equal the receive time limit variable.

* * * * *